United States Patent [19]

Izzi, Sr.

[11] Patent Number: 4,630,368

[45] Date of Patent: Dec. 23, 1986

[54] FLUSH CUT HANDSAWS

[75] Inventor: Lewis B. Izzi, Sr., Shelby, N.C.

[73] Assignee: Plastic Oddities, Inc., Shelby, N.C.

[21] Appl. No.: 710,230

[22] Filed: Mar. 11, 1985

[51] Int. Cl.$^4$ .............................................. B26B 29/00
[52] U.S. Cl. ........................................ 30/289; 30/505; 30/519
[58] Field of Search .......................... 30/289, 505, 519

[56] References Cited

U.S. PATENT DOCUMENTS

| 327,776 | 10/1885 | Eisenhardt | 30/519 |
| 616,927 | 1/1899 | Hicks . | |
| 627,615 | 6/1899 | Hicks . | |
| 1,119,787 | 12/1914 | Pause | 30/519 |
| 1,277,131 | 8/1918 | Ruth . | |
| 2,836,209 | 5/1958 | Zena | 30/505 X |
| 3,038,255 | 6/1962 | Zabransky | 30/505 X |

Primary Examiner—E. R. Kazenske
Assistant Examiner—Willmon Fridie, Jr.
Attorney, Agent, or Firm—Laurence R. Brown

[57] ABSTRACT

A flush cut handsaw has a generally planar handle oriented in a plane perpendicular to and parallel to the saw blade axis, or saw tooth edge, and on one side of the blade so that the saw may be manually used in a conventional sawing mode with the saw blade riding on and parallel with the floor surface. The saw is particularly useful in cutting off plastic plumbing pipes flush with the floor surface and in other circumstances where a smooth, even cut without slant or skew is required.

2 Claims, 3 Drawing Figures

FLUSH CUT HANDSAWS

TECHNICAL FIELD

This invention relates to handsaws and more particularly it relates to handsaws having handles arranged to permit the saw to be used for flush cutting adjacent a board or a wall.

BACKGROUND ART

In the plumbing arts, plastic said pipes are now in widespread use. Particularly in new construction, the piping may be roughed in before the floor is prepared. In such cases the pipe extends above the final floor level, whether poured concrete or wooden, and need be cut off flush with the floor when the plumbing connections are to be made. As shown in U.S. Pat. No. 4,406,480 issued Sept. 27, 1983, it is desirable to cut off such pipes flush with the floor for the connection of a water closet, for example. Thus, there is a need for a special tool that cuts the plastic pipe flush with the floor. In general, the plastic pipe may be cut off with conventional saw blades, but prior art saws are not constructed to be manipulated conveniently by hand in a mode that efficiently and effectively follows a floor contour to cut off a pipe or a stud, etc. flush adjacent the floor level.

The prior art has considered the problem of flush cutting with handsaws. Thus, in two U.S. Pat. Nos. namely 616,927 issued to E. J. Hicks on Jan. 3. 1899 and 627,615 issued June 27, 1899, a saw handle is laterally offset on one side of the saw blade with enough clearance to afford the necessary room for a hand grasping the handle to manipulate the saw when it is close to walls. An alternative construction for off-setting the saw handle is set forth in U.S. Pat. No. 1,277,131 to M. Ruth, of Aug. 27, 1918 which provides a pintle and clamp to pivot the handle selectively from the plane of the blade to an angle of 90 degrees to the saw blade, thereby attaining the offset handle feature obtained by the Hicks patents.

However, as any craftsman familiar with a handsaw knows, a clean straight cut is only feasible with a natural rhythmic non-forced cutting action. A carpenter, or the like, who is to do the flush cutting thereby need manipulate the saw blade in a conventional manner that retains the rhythmic cutting action for obtaining a clean straight cut. This is particularly desirable in the plumbing arts for plastic pipe that may need be fitted to other close fitting plastic piping by solvent welding techniques. These prior art handles laterally offset parallel to the saw blade cannot be used with a natural sawing rhythm learned long before by a craftsman to cut off a pipe or stud flush with a floor surface, because of the awkward hand position and the floor level action site. Thus, it is not usually feasible with these prior art saws to get a clean straight cut flush to a floor surface.

It is therefore an object of this invention to provide a special saw blade handle construction permitting a skilled craftsman familiar with sawing clean straight cuts to use the saw in his natural comfortable stance to cut off plastic pipes, or the like, extending from the surface of a floor.

Other objects, features and advantages of the invention will be found throughout the following description, drawings and claims.

DISCLOSURE OF THE INVENTION

This invention provides a handsaw construction that can be used with a conventional and natural stroke for making a flush cut adjacent the floor, thus assuring a clean straight cut particularly desirable for cutting off lengths of plastic soil pipe extending through a floor surface in new construction. Thus, the handle is mounted perpendicular to the plane of the saw blade and is offset from the floor to permit comfortable normal manual grasping of the saw handle.

To mount the saw handle on a conventional saw blade and adapt it for either conventional use of the saw or flush cutting an adapter is used for remounting the handle in a position perpendicular to the saw blade and offset from the floor with the blade unobstructed for parallel on the floor manipulation for flush cutting.

The handle to saw blade adapter is in the form of a right triangular member of enough thickness to fit onto the end handle connection portion of a conventional flat saw blade. Thus the saw blade may be bolted onto one of the right angular sides of the adapter to reside flush with and parallel to the floor. The conventional handle which is usually mounted on the saw blade then may be mounted on the remaining right angular side of the adapter rather than on the saw blade to be positioned perpendicular to the saw blade and thus to the floor when cutting off a plastic pipe flush with the floor. In this position, the handgrip and the possibility of the conventional rhythmic arm motion connected with hand sawing will permit a clean straight cut without fatigue, or awkwardness that can easily result in unusual pressure or biting of the saw to make a jagged uneven cut particularly undesirable when cutting off plastic piping to be interfitted with other plumbing fixtures.

BRIEF DESCRIPTION OF THE DRAWINGS

In the several views, like reference characters are used for similar features to facilitate comparison. In the drawings.

THE PREFERRED EMBODIMENT

Figure 3:
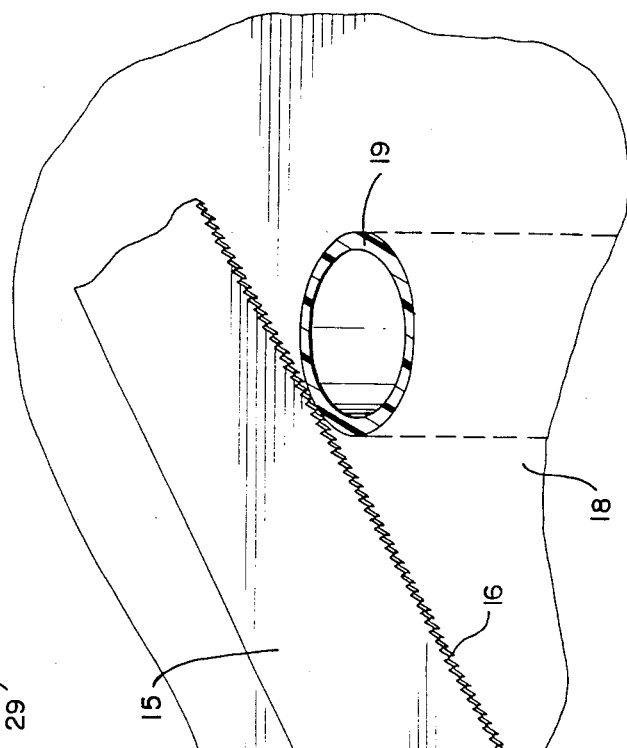
FIG. 3 is a perspective view of an adapter provided by this invention for remounting a saw handle in a position perpendicular to the saw blade on one side of the blade.

As may be seen in the drawings, the saw blade 15, having cutting teeth 16, is mounted with respect to the handle 17, so that the blade 15 may rest against a planar surface, such as the cement floor 18, from which the plastic pipe 19 protrudes. The flow surface thus serves in the same manner as a mitre box to align the saw blade for making a straight cut across the plastic pipe flush at the floor level. In this respect the generally triangular shaped adapter 20, of thickness T, rests on top of blade 15 helping to hold it parallel to the surface of the floor and resting thereupon.

Figure 2:
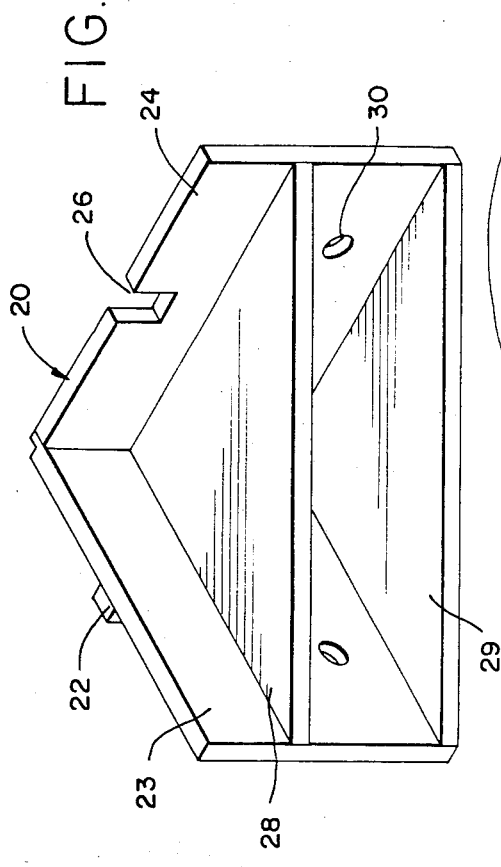
FIG. 2 is an end view of the saw embodiment.

As seen from FIG. 2, the blade is mounted to adapter 20 by bolts 21 in countersunk holes in the saw blade to permit flush sawing at the surface level without any angle in the pipe end or separation from the floor surface level after the cut. In general, saw blades have registration slots 21 at the handle end, and the adapter 20 preferably has a mating registration ridge 22 to fit thereinto for strengthening the coupling joint between the blade mounting right angular surface 23 of the adapter 20 and blade 15.

Figure 1:
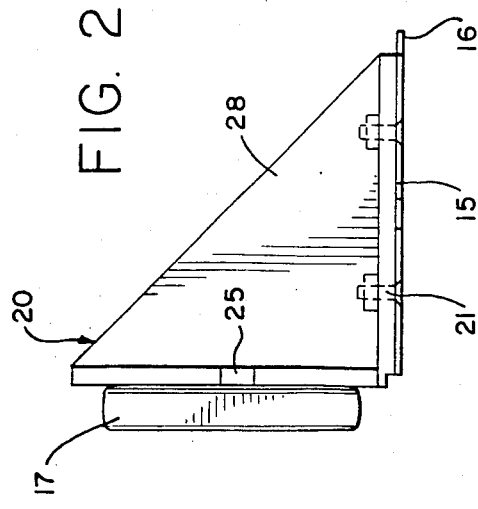
FIG. 1 is a perspective sketch of a handsaw embodiment of the invention, with a handle mounted perpendicular to the saw blade and offset from the blade to permit flush cutting adjacent the floor.
Figure 1:
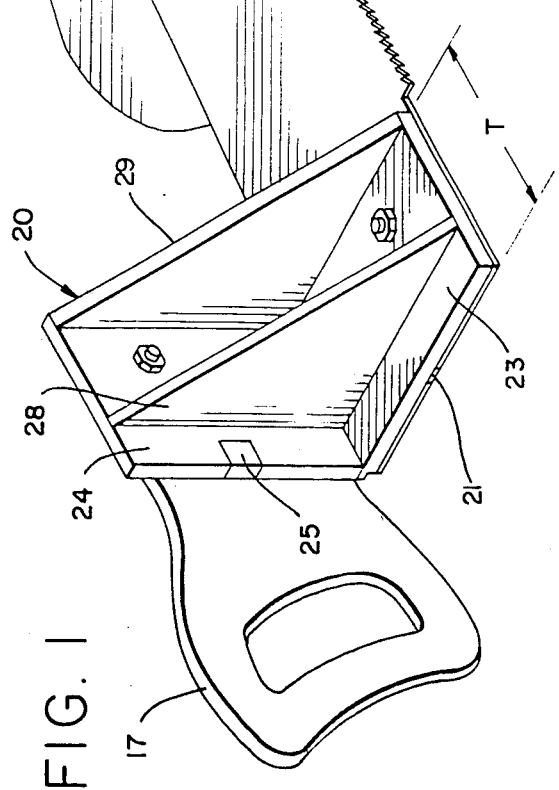

It may be seen from FIG. 1 that the pipe 19, or other object, which protrudes from the surface of floor 18 may be sawed off by locating the longitudinal saw blade 15 flat on the floor surface, attaching a generally planar handle 17 to extend above the saw blade 15 in a plane perpendicular thereinto and parallel to the blade axis, and manually grasping the handle 17 to propell the blade parallel to the floor in a sawing action to saw off the part of the object above the floor surface.

The detachable handle 17 is similarly mounted on the remaining handle mounting right angular surface 24 of the adapter 20 with ridge 25 of the handle 17 mating into slot 26 for strengthening the handle-to-adapter coupling joint.

The generally right angle triangular shaped adapter 20 thus places the handle 17 perpendicular to the blade 15 and offset from the floor surface so that a natural and normal handle grip and stroke can be used for sawing. Thus, the sawing should proceed straight and evenly without roughness on the cut off pipe or stud from an inadvertent twisting of the handle during the sawing stroke or an uneven biting stroke that tends to chip the pipe edges or leave ridges in the pipe stud.

It is readily evident that this flush cut handsaw arrangement therefore provides improved cutting action for flush cuts that are critical to smooth even saw cut finish or small differences in angle of cut through a pipe, or the like, and which is comfortable to use and does not require development of new sawing skills or discomfort from unusual arm positions during sawing.

The generally right triangular adapter block 20 has webs 28, 29 for bracing two right angular surfaces 23 and 24 adapted respectively for coupling to a saw blade 15 and handle 17, and permitting access to mounting bolt apertures 30, and the like. The outer right triangular surfaces are adapted to mate specifically with the handle 17 and blade 15 to hold them in a posture with the lower blade surface as shown in FIG. 1 in a flat plane that may ride against the floor during sawing, and with the handle lying in a plane perpendicular to the blade. The generally planar handle is mounted on one side of the blade 15 for propelling the saw manually in a flush cut sawing motion while the blade 15 rides against the floor surface.

Having improved the state of the art therefore, those novel features believed descriptive of the nature and spirit of the invention are defined with particularity in the appended claims.

I claim:

1. A flush cut saw comprising in combination, a flat saw blade, handle mounting means comprising two walls at substantially a right angle to each other, said walls forming two outer flat rectangular surfaces, said blade being affixed to one of said walls on the flat outer surface thereof, a handle affixed to the other of said walls positioned substantially parallel along the plane of said other wall for propelling the saw blade with said handle oriented to lie in a plane substantially perpendicular to the saw blade to position the flat saw blade flush on the surface above which a projecting object is to be removed, said flat blade being in flush contiguous contact with the surface.

2. A flush cut saw as claimed in claim 1 wherein the entire width of said flat saw blade bears flush against the surface along its entire length.

* * * * *